(12) United States Patent
Donoho

(10) Patent No.: US 9,078,423 B2
(45) Date of Patent: Jul. 14, 2015

(54) TRANSLUCENT ELECTRIFIED BIRD DETERRENT DEVICE

(71) Applicant: Bird-B-Gone, Inc., Mission Viejo, CA (US)

(72) Inventor: Bruce Donoho, Mission Viejo, CA (US)

(73) Assignee: Bird-B-Gone, Inc., Mission Viejo, CA (US)

( * ) Notice: Subject to any disclaimer, the term of this patent is extended or adjusted under 35 U.S.C. 154(b) by 216 days.

(21) Appl. No.: 13/875,088

(22) Filed: May 1, 2013

(65) Prior Publication Data

US 2013/0291426 A1 Nov. 7, 2013

Related U.S. Application Data

(60) Provisional application No. 61/641,081, filed on May 1, 2012.

(51) Int. Cl.
*A01M 19/00* (2006.01)
*A01M 29/26* (2011.01)

(52) U.S. Cl.
CPC .................................. *A01M 29/26* (2013.01)

(58) Field of Classification Search
USPC ............. 43/98, 98.1, 112; 340/573.2; 256/10; 361/232; 119/537
See application file for complete search history.

(56) References Cited

U.S. PATENT DOCUMENTS

| | | | |
|---|---|---|---|
| 4,015,176 A | 3/1977 | Shanahan et al. | |
| 5,031,353 A | 7/1991 | Gardiner | |
| 6,006,698 A | 12/1999 | Negre | |
| 6,283,064 B1 | 9/2001 | Djukastein et al. | |
| 6,928,768 B1 | 8/2005 | Snow | |
| 7,249,436 B2 * | 7/2007 | Ravenelle et al. | 43/98 |
| 8,054,186 B1 * | 11/2011 | Ray et al. | 340/573.2 |
| 2005/0132635 A1 | 6/2005 | Riddell | |
| 2005/0132636 A1 * | 6/2005 | McGill et al. | 43/98 |
| 2011/0023792 A1 * | 2/2011 | Osypka | 119/721 |

FOREIGN PATENT DOCUMENTS

EP 1314355 11/2002

\* cited by examiner

*Primary Examiner* — Christopher P Ellis
(74) *Attorney, Agent, or Firm* — Fish & Tsang LLP

(57) ABSTRACT

Electrical deterrent device having a translucent or transparent base are presented. The elongated base can include at least one and preferably two conductors coupled to the base. A plurality of reflective elements can be embedded within or disposed on an outside surface of the base.

16 Claims, 3 Drawing Sheets

TRANSLUCENT ELECTRIFIED BIRD DETERRENT DEVICE

This application claims the benefit of priority to U.S. Provisional Application No. 61/641,081 filed on May 1, 2012. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is animal and pest deterrents, and especially bird deterrent devices.

BACKGROUND

The following background discussion includes information that may be useful in understanding the present invention. It is not an admission that any of the information provided herein is prior art or relevant to the presently claimed invention, or that any publication specifically or implicitly referenced is prior art.

There are numerous animal deterring devices known in the art, many of which use electric current to deter, and in some cases even kill, birds and other relatively small animals. For example, where a relatively large structure is to be protected, a blanket can be configured to include a plurality of vertically arranged and spaced apart electrodes as described in U.S. Pat. No. 6,925,748.

Other known electrified devices include those described in U.S. Pat. No. 4,015,176, EPO Patent No. 1314355, U.S. Pat. No. 5,031,353, U.S. Pat. No. 6,006,698, U.S. Patent Publication No. 2005/0132635, U.S. Pat. No. 6,283,064, and U.S. Pat. No. 6,928,768. However, all of the devices described in the above references are not aesthetically pleasing and can create eyesores when installed. Because of this, the locations where the deterrents can be installed are limited.

Interestingly, known solutions merely provide a selection of opaque bases in a few different colors in an attempt to blend the devices in with the surrounding environment. It has yet to be appreciated that electrified deterrent devices can be produced having a transparent or translucent base, such that the deterrent devices can effectively blend in to the surrounding environment.

Thus, while various electrical bird deterrents are known in the art, there is still a need for electrical deterrent devices having a translucent body.

SUMMARY OF THE INVENTION

The inventive subject matter provides apparatus, systems and methods in which an electrical deterrent device can include an elongated translucent or transparent base having one or more electrical conductors coupled to the base, preferably via sewing.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1A:
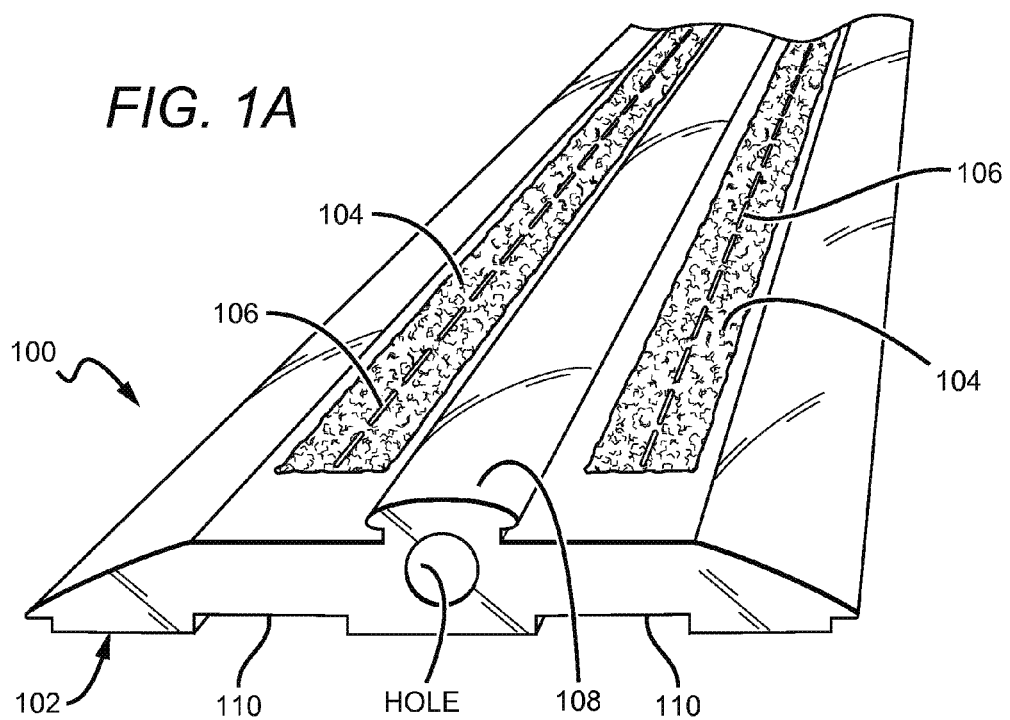
FIGS. 1A-1B are top and bottom perspective views of one embodiment of a deterrent device.
Figure 1B:
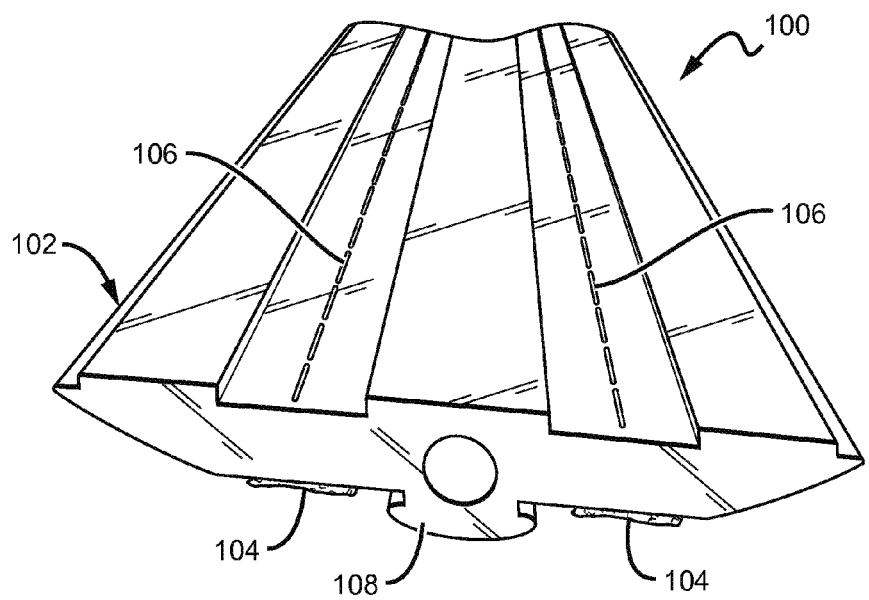

FIGS. 1A-1B illustrate an embodiment of an electrical deterrent device 100 having an elongated, translucent base 102. Rather than form the base from opaque material of various colors, the base 102 is preferably composed of a translucent material such that the device 100 can blend in with the surrounding environment where it is installed. In such embodiments, the need to manufacture and stock devices of different colors can be eliminated, which allows a single device to be manufactured and distributed and thus reduces the overall cost of the device 100.

The base 102 preferably comprises a polyvinyl chloride (PVC) vinyl compound, although any commercially suitable material(s) could be used such that the base 102 is translucent. It is especially preferred that the base 102 includes a UV-resistant material or coating because device 100 is generally disposed outdoors. To that end, it is contemplated that base 102 could be formed from a translucent, UV-resistant material such as a PVC vinyl compound, or be coated with a UV-resistant compound after formation of the base 102 during or after manufacturing. It is currently preferred that the base 102 comprises V4-22 Clear UV PVC compound offered for sale by Hoffman Plastic Compounds, Inc. However, especially preferred materials include those that provide sufficient flexibility such that the base 102 can conform to uneven surfaces. Furthermore, it is generally preferred that the base material is non-conductive.

Translucent or transparent base 102 can advantageously include a plurality of reflective elements or be coated with a reflective spray, which can act as a secondary deterrent against birds for example. In this manner, the reflective elements or coating of the device 100 can scare birds from the area, while still allowing the translucent or transparent device 100 to blend in to the surrounding area. Exemplary reflective elements include, for example, metal or glass shards or fragments, metal or glass spheres, including microspheres, and any combination(s) thereof. It is contemplated that such reflective elements could be embedded within the primary base material during the manufacturing process, or could be coupled to an upper surface of the base 102. Although the use of reflective elements or spray is referred to as a secondary deterrent, in some cases it could be a primary deterrent of the device 100.

Typically, base 102 will have a strip or otherwise elongated configuration, and is most preferably relatively flat (i.e., has a width and length that is larger than the height) such that the device 100 can be bent, or even provided in a rolled-up configuration. The particular width and height of the base 102 will typically be determined by the size of bird or other animal to be deterred. Thus, and most commonly, the base 102 will be configured such that device 100 has a height to width ratio between 1:5 and 1:2, and more typically between 1:4 and 1:3. For example, suitable bases may have a width between 1 cm and 10 cm, more typically between 2 cm and 7 cm, and most typically between 3 cm and 5 cm. The length of such devices is generally determined by the desired overall length of the device or device segment and may therefore vary between several cm and several meters and even longer. The height of contemplated devices will generally be between 1 mm and 3 cm, and more typically between 3 mm and 1 cm.

Base 102 has at least one and preferably two electrical conductors 104 that extend longitudinally along a length of the base 102. Although it is preferred that the conductors 104 extend substantially the entire length of the base 102, it is contemplated that the conductors could extend along only a set portion of the base 102. Where the base 102 has two conductors, the conductors 104 are typically spaced apart at a distance that allows formation of an electric circuit when a foot of a bird (e.g., an adult pigeon, an adult seagull) rests on the device 100. Therefore, and depending on the particular bird, suitable distances between first and second conductors will be between 5.0 mm and 2.0 cm, and more typically between 0.7 and 1.5 cm.

The conductors 104 are preferably knitted, although braided and other types of conductors are contemplated. It is especially preferred that the conductors 104 comprise at least one conducting strand knitted with at least itself, or with additional conducting strands, to form an elongated conducting band. The conducting band can be knitted as a flat sheet, a tube, or even multiple tubes nested within each other. It is also contemplated that the conducting band can include a non-braided or non-warp and weft mesh, woven strand. A detailed discussion of various types of knitted conductors can be found in U.S. Pat. Nos. 8,196,340 and 8,424,238, both of which are incorporated by reference.

Preferred conductors are manufactured from robust conducting metals capable of withstanding outdoor extremes. Example suitable conducting metals include stainless steel (e.g., 316L), or other conducting materials that are resistant to corrosion and are suitable for outdoor use. One acceptable conducting material includes Monel®, which has improved electrical conductivity over many stainless steels. A currently preferred conductor for use in an outdoor deterrent device includes corrosion resistant copper, ETP 0.005 inch diameter, tin-plated knitted wire mesh stocking (e.g., tube).

The conductors 104 are preferably sewn to the base 102 using a fabric or plastic (e.g., nylon) thread 106, but could alternatively be coupled to the base 102 using any commercially suitable fastener(s) including, for example, glue and other adhesives, plastic or metal staples, friction fit, and any combination(s) thereof. Where sewn to base 102, it is preferred that the conductors 104 are sewn such that the thread extends from the conductor to a trough or portion of the base that doesn't contact a mounting surface. The conductors 104 may be coupled to the base 102 on a horizontal or angled surface of base 102.

A raised portion 108 of the base 102 preferably separates the conductors 104 and functions as an arc suppressor. In some contemplated embodiments, the raised portion 108 can have an umbrelloid shape. A more detailed discussion of possible arc suppressors can be found in U.S. Pat. Nos. 7,802,396 and 7,937,885, both of which are incorporated by reference.

Where desired, at least part of the base 102 and/or at least part of the raised portion 108 is angled, wherein the angle is selected such that when the device 100 is installed on horizontal surface water runs off the angled part.

It is contemplated that the base 102 could include troughs 110 on its bottom surface, which are essentially channels, notches, or grooves that result in a discontinuous bottom surface of the base 102. It is especially preferred that the troughs 110 are disposed beneath the conductors 104. Where the conductors 104 are sewn to the base 102, it is contemplated that the conductors 104 can be sewn such that the thread or other fastener extends from the conductor 104 to the trough 110, resulting in a seam along the conductor 104 and trough 110, as shown in FIGS. 1A-1B.

Sewing the conductors 104 to the base 102 advantageously allows the conductors 104 to flex as the base 102 flexes. Furthermore, sewing the conductors 104 to the troughs 110 rather than the bottom of base 102 advantageously raises the seams from the bottom of base 102. This helps prevents shorting of the conductors 104 due to wicking of water or other fluid up the thread 106. In addition, the troughs 110 also help prevent any pieces of conductor 104 frayed during the manufacturing process from contacting the mounting surface. Where glue or other adhesive is disposed in the troughs 110, whether intentionally or via displacement of glue when the device 100 is mounted to a surface, for example, the glue can provide an additional barrier between any water or other fluid on the surface and the thread 106.

It is further contemplated that shorting of the conductors 104 can also be prevented by using nylon or other plastic thread, for example, which unlike traditional thread, will prevent water from seeping up the thread.

Figure 2:
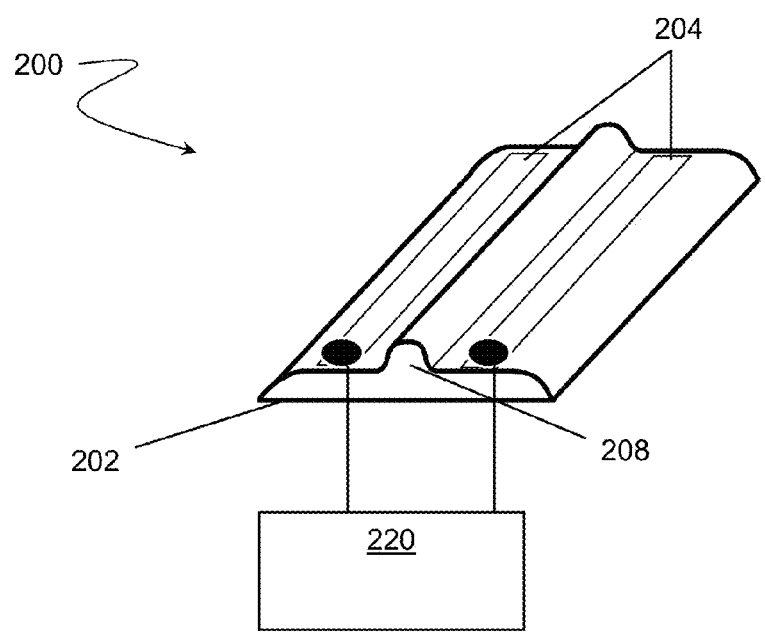
FIG. 2 is a perspective view of another embodiment of a deterrent device.

FIG. 2 illustrates another embodiment of an electrical deterrent device 200 having a flat bottom. The device can include conductors 204, which can couple to an electrical power source 220 via electrical connectors. With respect to the remaining numerals in FIG. 2, the same considerations for like components with like numerals of FIG. 1 apply.

Figure 3:
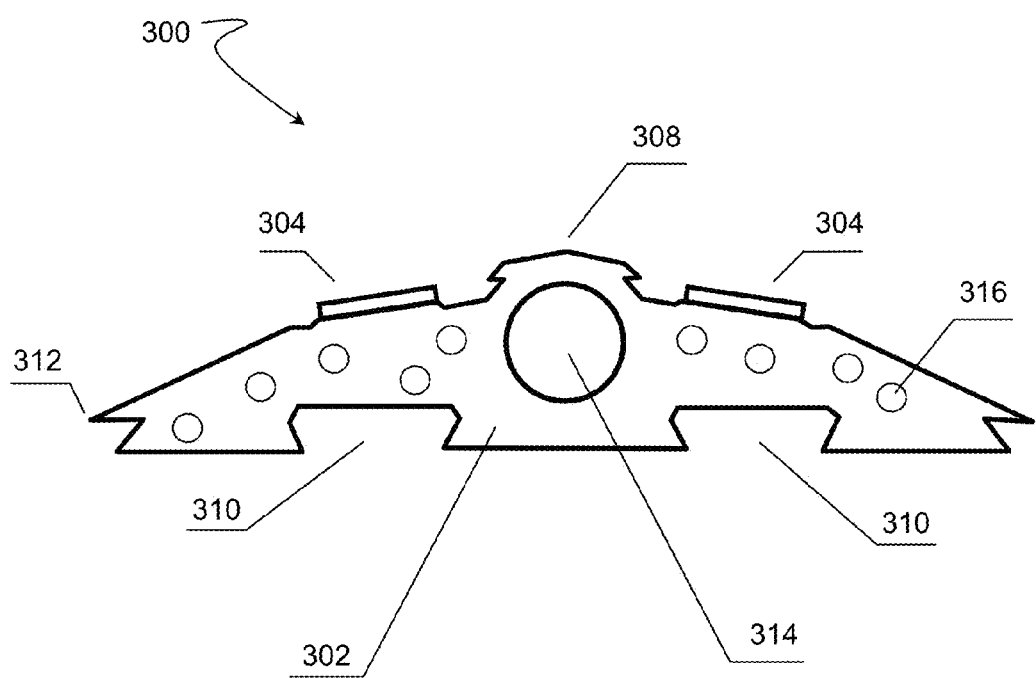
FIG. 3 is a cross-section view of yet another embodiment of a deterrent device.

In FIG. 3, a cross section view of another embodiment of a deterrent device 300 is shown, which includes two parallel conductors 304, preferably comprising knitted conducting strands forming elongated bands or strips. Device 300 can include a raised portion acting as an insulator 308, which can help prevent arcing from one conductor to another. Device 300 can further include one or more anti-arc lips 312 to prevent arcing to a mounting surface.

Base 302 can include a plurality of reflective elements 316, which advantageously act as an additional deterrent against birds when birds see light being reflected or reflected as a result of the reflective elements 316. Although depicted as spheres embedded in the base, it is contemplated that the reflective elements 316 could comprise any suitable shape, and may comprise glass or metal shards for example. Rather than embed the elements 316 within the base 302, the elements could be disposed on an upper surface of the base 302, for example.

Device 300 can also include a hole 314 disposed in a middle portion of the device 300. It is contemplated that the hole 314 can be extruded as part of base 302 and may be placed at the thickest portion of base 302. Hole 314 advantageously reduces the amount of material to form the base 302, thereby reducing the weight of, and cost of manufacturing, the device 300, while also reducing resistance to cutting and providing for greater flexibility when installing the device around sharp corners, for example. With respect to the remaining numerals in FIG. 3, the same considerations for like components with like numerals of FIG. 1 apply.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. An electrified deterrent device, comprising:
   an elongated, translucent base;
   first and second conductors coupled to the elongated, translucent base; and
   wherein the elongated, translucent base comprises a plurality of reflective elements.

2. The electrified deterrent device of claim 1, wherein the base further comprises an extruded hole disposed along a length of the base.

3. The electrified deterrent device of claim 1, wherein the first and second conductors are each attached to the base via sewing.

4. The electrified deterrent device of claim 1, wherein the first and second conductors are each attached to the base via a friction-fit.

5. The electrified deterrent device of claim 1, wherein the plurality of reflective elements are embedded within the base.

6. The electrified deterrent device of claim 5, wherein the plurality of reflective elements comprise a plurality of spheres.

7. The electrified deterrent device of claim 6, wherein the plurality of spheres are composed of glass.

8. The electrified deterrent device of claim 1, wherein the plurality of reflective elements comprises a coating disposed on at least a portion of the base.

9. The electrified deterrent device of claim 1, wherein the plurality of reflective elements comprises a reflective coating embedded within the base.

10. The electrified deterrent device of claim 1, wherein the first and second conductors each comprises a braided wire.

11. The electrified deterrent device of claim 1, wherein the first and second conductors each comprises a knitted wire.

12. The electrified deterrent device of claim 1, wherein the base is composed of a polyvinyl chloride vinyl compound.

13. The electrified deterrent device of claim 1, wherein the base is composed of an ultraviolet-resistant material.

14. The electrified deterrent device of claim 1, wherein the base comprises a first trough disposed on a bottom surface of the base.

15. The electrified deterrent device of claim 1, wherein the base comprises first and second troughs disposed beneath the first and second conductors, respectively.

16. The electrified deterrent device of claim 1, wherein the base has an UV-resistant coating.

* * * * *